United States Patent
Mathews

Patent Number: 5,535,833
Date of Patent: Jul. 16, 1996

[54] TOOL FOR WEEDING

[76] Inventor: Linden H. Mathews, 3366 E. Fair Pl., Littleton, Colo. 80121

[21] Appl. No.: 85,811

[22] Filed: Sep. 8, 1993

[51] Int. Cl.[6] ............................................. A01B 45/02
[52] U.S. Cl. ............................ 172/371; 294/50.9; 172/22
[58] Field of Search ............................ 172/19, 21, 22, 172/328, 371; 175/20; 294/50.9, 50.6; 30/251

[56] References Cited

U.S. PATENT DOCUMENTS

| | | | |
|---|---|---|---|
| 332,169 | 12/1885 | Stooking | 294/50.9 |
| 694,088 | 2/1902 | Bowman | 294/50.9 |
| 872,250 | 11/1907 | Shank. | |
| 1,855,477 | 4/1932 | Emery. | |
| 1,881,112 | 10/1932 | Allewson | 294/50.9 |
| 1,908,322 | 5/1933 | Cook. | |
| 1,951,978 | 3/1934 | Hastins | 294/50.6 |
| 1,979,432 | 11/1934 | Zander | 294/50.9 |
| 1,989,932 | 2/1935 | Junkin. | |
| 2,087,128 | 7/1937 | Stalker. | |
| 2,708,593 | 5/1955 | Benoist | 172/22 |
| 2,806,733 | 9/1957 | Hund. | |
| 3,147,718 | 9/1964 | Steinberg | 294/50.6 |
| 3,246,877 | 4/1966 | Lino | 294/50.9 |
| 3,276,805 | 10/1966 | Lambert. | |
| 4,400,029 | 8/1983 | Delpidio | 294/50.9 |
| 4,556,114 | 12/1985 | Ryan | 172/22 |
| 4,633,957 | 1/1987 | Prost | 172/22 |

*Primary Examiner*—Spencer K. Warnick, IV

[57] ABSTRACT

Hand weeding tools have attempted to remove unwanted weeds from lawns and gardens by extracting as much of the root structure as possible. Usually, the extracted weed must be picked up after extraction. The disclosed device includes a curving cylindrical blade on one end of an elongated rod and a handle on the other. A lever on the handle operates a weed engaging jaw that grips the extracted weed against the concave surface of the curved blade. The jaw is pivotally hinged to the blade so that the jaw can be closed into the blade thus preventing unintended penetration of the blade into the soil, as when the tool is used as a cane to aid in walking or standing.

3 Claims, 2 Drawing Sheets

TOOL FOR WEEDING

BACKGROUND OF THE INVENTION

The subject invention relates to the field of hand tools, and in particular to tools used to remove weeds from lawns and gardens generally known as weeding tools, or more briefly "weeders".

There have been many forms of weeding tools. It has been the assumption, accurate for many species of lawn weeds, that such weeds can easily grow back from any root material left after the leaves and stems of the weed have been extracted. Thus, the consistent goals of these tools have been to remove most or all the weed, including the root system, while minimally disturbing the surrounding soil and desirable grass plants. But with most prior art weeders these goals, (maximum root removal with minimum soil and surrounding plant disturbance), can be consistently achieved only with the application of a considerable manual dexterity, practice and patience. Even if the weeds were successfully removed from the soil, there remains the problem of quickly and neatly disposing of the extracted weed, since to leave the weed where it lay would not only be unsightly, but counterproductive, since the weed may become the source of weed seedlings, especially if the extracted weed includes a flower or seed head.

Prior weeding tools have not fully addressed these issues, especially for older users or those individuals with reduced back mobility and hand or arm strength. Any weeder, even those with elongated shafts to permit use while standing up, tend to require the user to stoop or kneel to complete the extraction and disposal operation.

OBJECTS AND BRIEF SUMMARY OF THE INVENTION

Accordingly, it is an object of the invention to provide a manually operated weeding tool that can be operated from a standing position to remove weeds, complete with roots, and dispose of the extracted weed, all without stooping or kneeling.

It is another object of the invention to provide the older person an incentive to walk with confidence normally provided by a conventional cane or walking stick, while also giving a sense of accomplishment derived from extracting weeds and cleaning up the removed weeds during what would otherwise be an ordinary walk.

In particular, disclosed is a combination garden weeder and walking stick comprising an elongated shaft, a hand grip mounted to one end of the shaft, a digging and grabbing implement mounted at the other end of the shaft, the implement including a generally semicylindrical blade member with a cutting edge for cutting a curved slot in the soil surrounding at least the main root of a weed to be extracted from the soil. A grabbing jaw is mounted to the shaft for movement between an open position and a closed position with means for pivotally mounting said jaw to the shaft. The jaw has a first end at the means for pivotally mounting, and a second end extending a distance from the means for mounting, the second end of the jaw operating to engage the weed to be removed after the cutting edge of the blade penetrates the earth around the weed, the jaw being sized to effectively block soil from passing by the jaw and along the rest of the curved blade member when the device is used as a walking stick, only the portion of the blade between the cutting edge and the jaw is likely to penetrate into average soil.

DETAILED DESCRIPTION OF THE PREFERRED EMBODIMENT

Figure 1:
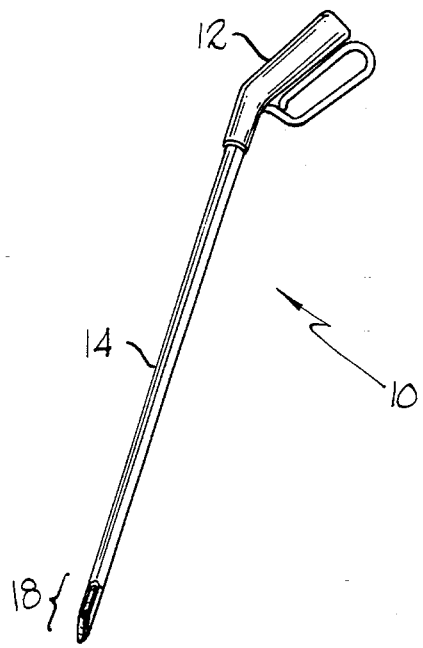
FIG. 1 is a perspective view of the preferred form of the weeder.
Figure 2:
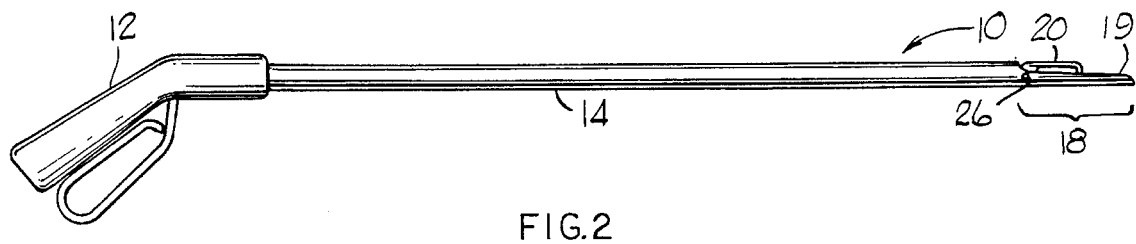
FIGS. 2 through 4 are side top and bottom views respectively of the weeder shown if FIG. 1.
Figure 3:
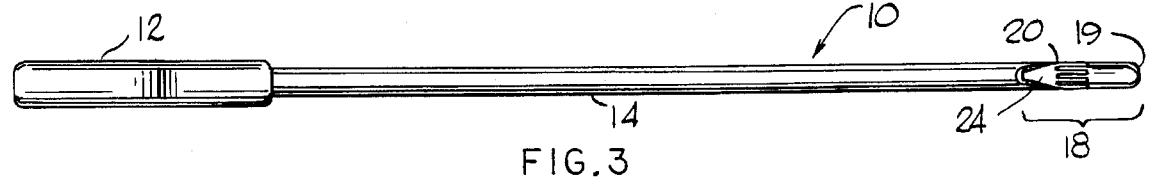
Figure 4:
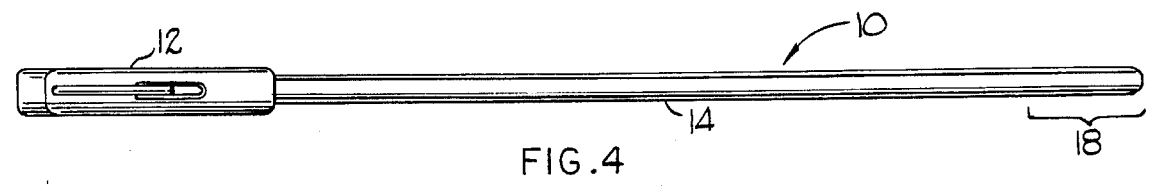
Figure 5:
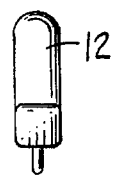
FIGS. 5 and 6 show respectively the upper end and lower end of the weeder.
Figure 6:
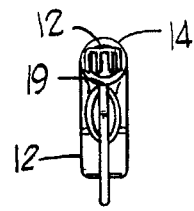

The weeder 10 includes a hand grip 12 that is sized to fill the hand of an adult user. The relatively large cylindrical grip 12 is angled relative to the elongated shaft 14 attached at its lower end by screws 16 or the like. The angle between the axis of the cylindrical grip 12 and that of the shaft is at least about 30 degrees, preferably about 45 degrees. This angled relationship lets the user lean on the tool 10 to steady the user during standing or walking, permits resting during walking or weeding, and aids in pushing the cutting blade 18 into the soil, as will be derailed below.

Pivoted to the grip 12 is a movable lever 34 that can be manipulated by the user to operate the gripping jaw 20, preferably made of stainless steel, located at the other end the shaft. The lever preferably includes a generous loop 36 sized to receive all four fingers of the hand holding the grip 12.

Figure 7:
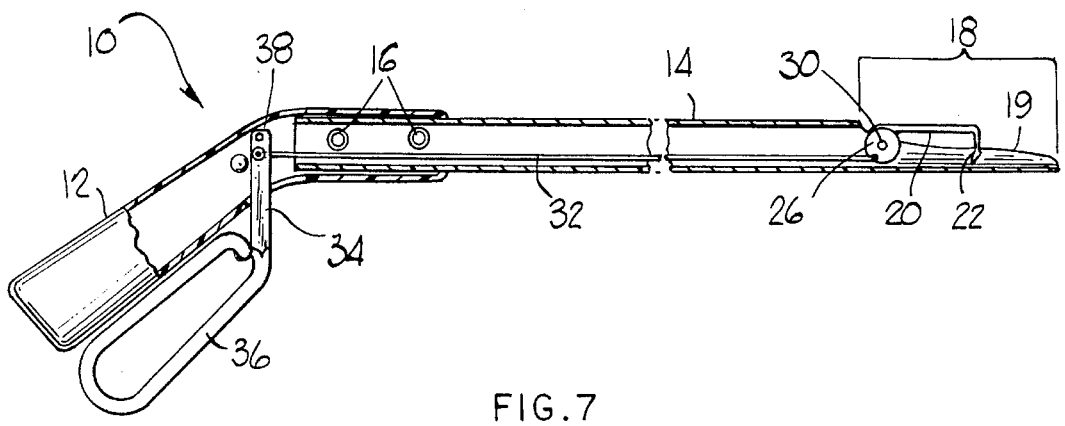
FIG. 7 is a cross sectional view of the weeder showing the jaw thereof in a closed position.
Figure 8:
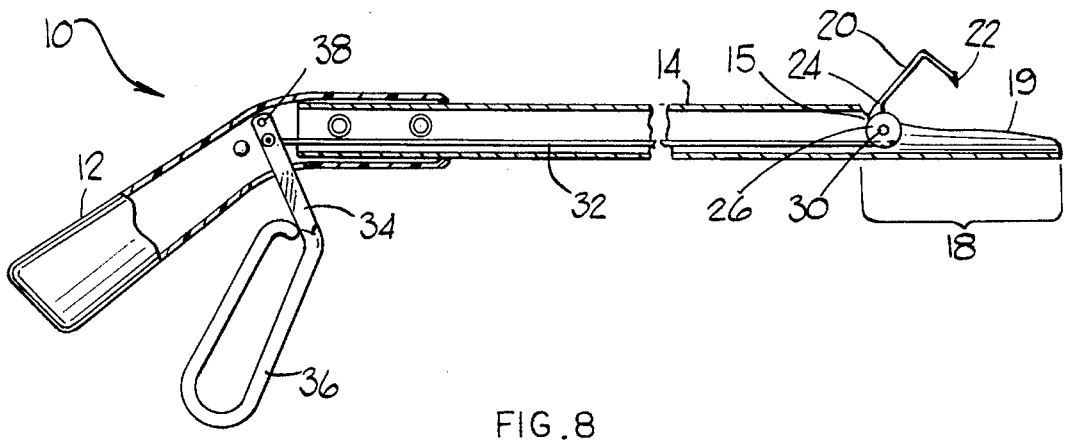
FIG. 8 is similar to FIG. 7 but with the jaw in an open position.

The shaft 14 is preferably a hollow cylindrical tube with a central elongated cavity extending the entire length from the grip to the blade. This cavity contains the operating mechanisms for the jaw, primarily an operating rod 32 that is journaled to the lever at a point next to its mounting axle 38 at the upper end of the shaft, and to the a hub portion 26 of the jaw 20 at the lower end of the shaft. As can be seen in FIGS. 7 and 8, the lower end of the operating rod 32 is attached to the hub at a distance from axle 30 on which hub portion 26 pivots.

The jaw 20 includes a hub 26 at its first or upper end, and terminates with a fork like portion having a series of tines 22 at its lower or second end. These tines are joined at a base 24 adjacent the hub 26. The tines themselves are curved, and preferably have pointed ends which curve at the second end of the jaw to point back towards the first (or hub) end of the jaw.

The digging blade is of generally semicylindrical shape thus having an inner curved side defining an elongated open trough shaped cavity. The lower most edge terminates at a curving cutting edge 19. The overall blade 18 has longitudinal dimension (along the axis of the shaft) which is defined between the juncture of the shaft and the blade (approximately at the axle 30) to the cutting edge. This longitudinal dimension should be adequate to cut a curved slot in the soil around the weed to be removed when the grip is pushed to force the blade into the soil. The depth of this slot, and thus the longitudinal dimension of the blade, should be adequate to loosen the soil around most of the main root of the weed, but not so long that the blade is likely to become jammed or stuck in compacted or adhesive, clay-like soils. The longitudinal dimension thus should be no less than 1.5", but no more than about 6.0", preferably about 2.0". The curving sharpened cutting edge is preferably sharp also along the longitudinal edges up to the jaw hub 26 so that once the curving slot is made in the soil around the weed root, the user can tilt the tool by applying a downward pressure on the grip 12 to free more of the soil immediately around the root for easier extraction.

The weed grabbing jaw 20 has an overall length (from hub to curved tine ends) such that the tines are well spaced from the weed to be extracted when the jaw is in its open position (FIG. 8.) Ideally, this length is about 1¾". The hub 26 is a cylinder that substantially fills the cavity 15 at the location of the axle 30. This hub thus acts to help stop or block the weed or soil from entering into the cavity past the hub. Thus, the hub acts to prevent the cutting blade from penetrating too deeply into the soil. When the jaw 20 is moved into the closed position as shown in FIG. 7 for example, the lower end of the jaws fits into the curve of the blade such that the tines 22 thereof substantially fill the curve of the blade at a location between the cutting edge of the blade and the shaft. This not only makes for a neat appearance, but the tines again operate to prevent undo penetration of the blade into the soil by acting as a stop in the same manner as the hub as explained above. In this configuration, the blade can penetrate only a small distance into the soil, preferably only about one half the longitudinal dimension of the blade. The lever is normally held close to the grip when the device is being used as a walking stick or cane. This stop function of the tines makes walking with the use of the device relatively safe and sure, since the blade penetrates the soil enough for a sure grip, but not so much that the weeder becomes firmly imbedded in the soil, at least under normal soil conditions.

The blade 18 and shaft 14 are preferably made of a single piece of rigid thin wall, stainless steel tube with adequate rigidity and temper to make a sturdy walking cane, but also take a keen, easily renewed cutting edge at one end. Thus, the steel tube forms a hollow cylindrical shaft attached to the other end of the blade. The longitudinal dimension of the shaft and the longitudinal dimension of the blade are parallel. A hand grip 12 is on the end of the shaft opposite to the blade. This hand grip being generally elongated with its long dimension at a substantial angle with the longitudinal dimension of the shaft. The preferred diameter of this tubing is between 1" and ½", most preferably about ¾" for the outside diameter. The grip is preferably of injection molded plastic, hollow to accommodated the various levers and linkages for operating the jaw and to be light weight. The jaw may be fabricated of stainless steel stampings and castings, while the rod 32 and levers can be made of any corrosion resistance material of adequate stiffness.

In operation, the device 10 is held in one hand with the fingers of that hand inserted through the loop 36 and the lever gripped firmly against the grip 12. In this condition, the blade shouldn't penetrate the soil much and the operation is like a cane or walking stick. To extract a weed, the user lifts the blade from the ground and releases hold of the lever 34. This permits the lever to fall to the position shown in FIG. 8, with this in turn opening the jaw into the open position as shown. The blade is now positioned to just adjacent the weed to be removed and a downward force is applied to the grip 12 to force the blade into the soil. If necessary, the handle is now tilted down to pry the root and a small cylinder of the adjacent soil from the surrounding turf. Then, the lever is pulled close to the grip 12, thus bringing the curving tines 22 into engagement under the exposed leaves and main stem of the reed. The entire weed, including a small cylinder of the soil immediately around the root, can be easily lifted out of the soil and can be deposited in an adjacent bucket or basket. A side benefit of this operation is that the removal of the cylinder of soil also aids in aeration of the area. The jaw function of the device can be used alone without using the weed extracting blade, as when the device is used to pick up sticks and trash from the yard.

I claim:

1. A combination garden weeder and walking stick comprising an elongated shaft, a cavity in said shaft, a hand grip mounted to one end of the shaft, a digging and grabbing implement mounted at the other end of the shaft, the implement including a generally semicylindrical blade member with a cutting edge for cutting a curved slot in the soil surrounding at least the main root of a weed to be extracted therefrom, a grabbing jaw pivotally mounted to the shaft for pivoting movement between an open position and a closed position, means for pivotally mounting said jaw to the shaft, the having a first end at said means for pivotally mounting, and a second end extending a distance from the means for mounting, the second end of the jaw operating to engage the weed to be removed after the cutting edge of the blade penetrates the earth around the weed, the jaw being sized to be effective to block soil from passing by the jaw and along the rest of the curved blade member, whereby, only the portion of the blade between the cutting edge and the jaw is likely to penetrate into average soil, as when the device is used as a walking stick, the jaw has a generally cylindrical hub at its first end, the hub is mounted on an axle extending across the diameter of the shaft, the rod has an end attached to the hub at a distance from the axle, the hub being sized to substantially block the cavity and inhibit entry of soil into the cavity.

2. A combination garden weeder and walking stick as set forth claim 1 wherein the blade has a longitudinal dimension and the elongated shaft has a longitudinal dimension, the longitudinal dimension of the shaft and the longitudinal dimension of the blade are parallel and the hand grip is generally elongated with its long dimension at a substantial angle with the longitudinal dimension of the shaft.

3. A weeding tool as set forth in claim 2 wherein the cutting edge of the blade continues up the sides of the semicylindrical blade.

* * * * *